June 20, 1944.    C. J. ECKERT    2,351,747
OPTICAL INSTRUMENT
Filed Sept. 5, 1942

CLARENCE J. ECKERT.
INVENTOR
BY
ATTORNEYS

Patented June 20, 1944

2,351,747

UNITED STATES PATENT OFFICE 2,351,747

OPTICAL INSTRUMENT

Clarence J. Eckert, Rochester, N. Y., assignor to Bausch & Lomb Optical Company, Rochester, N. Y., a corporation of New York Application September 5, 1942, Serial No. 457,418

8 Claims. (Cl. 88—57)

The present invention relates to optical instruments and more particularly to an optical instrument in which an ocular tube or eyepiece is adjustably mounted with respect to the instrument.

The present invention may be used in connection with any optical instrument in which an adjustably mounted ocular tube carries a band having a scale cooperable with an index or fiducial indicia on the instrument to indicate the position of the ocular tube.

In such optical instruments, it is customary to place the index or fiducial indicia for the ocular tube adjustment upon a mounting tube or some other part secured to or formed with the body of the instrument. In instruments where the index or fiducial indicia is carried by a detachable mounting tube, the indicia is not placed thereon until the tube has been fixed to the body of the instrument for the reason that it is desirable to have the index always in a definite position with reference to the instrument as a whole.

In the assembly of such instruments, after the mounting tube has been secured to the body of the instrument and the index mark placed thereon, the ocular tube is secured thereto and adjusted so that the same is positioned at its infinity point, after which the scale-carrying band on which the graduations of the eyepiece adjustment are arranged is placed on the ocular tube and the zero point aligned with the index of the mounting tube.

In some instruments heretofore proposed, after the band had been aligned with the ocular tube, a hole was bored through the band and the ocular tube was pointed to take a screw or the like to affix the band to the ocular tube. This operation was not done until after the adjusted position of the band was found and as a consequence the openings or holes for the screws varied in different instruments and required individual selection. The work necessarily had to be done by skilled workmen and this coupled with the fact that the band had to be adjusted relative to the ocular tube during the assembly operation of the instrument, greatly increased the cost of the assembly of the instrument.

To eliminate this costly assembly, it has been proposed to fix the band to the ocular tube through a pin carried by one of the members and adapted to be received within one of a plurality of notches or recesses formed in the other of the members. Although this obviated the necessity of drilling the band and tube, it was found that it was generally necessary to displace the band from its proper adjusted position relative to the index or fiducial indicia to bring the pin into one of the recesses or notches. The magnitude of this movement depended upon the size of the pin and the pin could not be made small enough to insure that very little movement was necessary to bring the pin into the notch for the pin then was apt to be sheared off or bent in the forming and other operations prior to the assembly operation. Furthermore, as the pin took all the strain of the coupling between the tube and the band, it often would be sheared off during the use of the instrument as the band in most instances was knurled and served as an operator for mechanically adjusting the ocular tube relative to the instrument.

Thus it was generally impossible to affix the band to the tube with any degree of accuracy and this method of assembly has not been adopted except in relatively inexpensive instruments where accuracy is not important.

The present invention obviates the difficulties of the prior constructions in that an eyepiece of a device made in accordance therewith can be quickly assembled by even relatively unskilled workmen without sacrificing accuracy. In a device made in accordance with the present invention, the scale-carrying band is formed with means for interlocking with correlated means formed on the ocular tube after the two parts have been properly adjusted relative to each other. The interlocking arrangement is such that there is no need to appreciably displace the band from its adjusted position to lock the same to the tube.

The interlocking means of the present invention comprise a plurality of teeth or serrations formed on contacting surfaces of the band and tube. The teeth of each surface are spaced apart at a distance such that they can be brought into engagement by a small amount of relative movement of the tube and band. Thus it is not necessary to move the band out of its proper adjusted position to interlock the same with the tube as in the prior construction. Even though the adjustment of the band relative to the tube can be made within a small fractional part of the units of the scale on the band, the coupling between the band and tube is sturdy and there is little danger of its failing during the life of the instrument.

As the interlocking means are identical with the corresponding means in all instruments, the same can be made in mass quantities and assembled by relatively unskilled workmen. Thus the assembly costs have been reduced and as the assembly costs have heretofore constituted a considerable portion of the cost of the finished instrument, a considerable reduction in the manufacturing cost of the instrument is effected.

Other objects and advantages of the present invention will appear in the following description taken in connection with the accompanying drawing in which.

Figure 1:
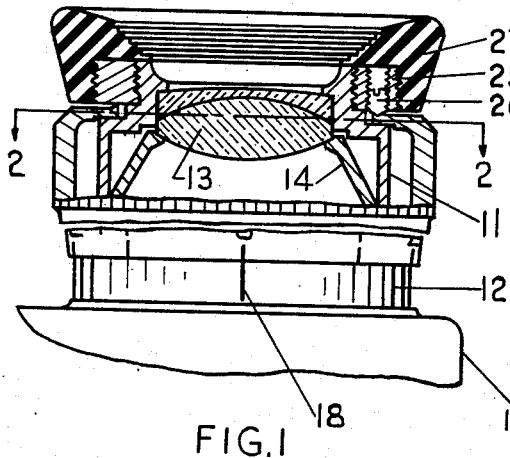
Fig. 1 is a fragmentary portion of an instrument showing the ocular tube and scale-carrying band partly in elevation and partly in section.

The present invention can be used wherever an eyepiece is adjustably carried by a body 10 of an instrument and in the now preferred embodiment thereof, comprises an ocular tube 11 adjustably mounted to a sleeve or mounting tube 12 fixed to the body 10 of the instrument. The ocular tube 11 carries a collective lens system 13 held in position thereon by a bezel 14.

The ocular tube is adjustable relative to the body 10 by means of a threaded connection to the mounting tube 12, the threads of the ocular tube being shown at 15.

To determine the position of the ocular tube relative to the body and its optical elements, it is common practice to secure to the ocular tube a band such as shown at 16 carrying a suitable scale 17, graduated here in diopters, cooperable with fiducial mark 18 on the fixed mounting tube 12 of the instrument. The scale 17 of the band permits a user to ascertain the position of the ocular tube relative to the body 10 of the instrument.

The scale-carrying band 16 of the device of the present invention is formed with an inturned flange 19 having a centrally disposed aperture of a diameter substantially equal to the diameter of a reduced portion 20 of the ocular tube 11. The band 16 telescopes the ocular tube 11 and the inner surface of the flange 19 is in facewise engagement with a shoulder 21 of the ocular tube 11 formed by the reduced portion 20. The tube 11 is further reduced beyond the portion 20 and externally threaded at 22.

In the prior construction most widely used, the diopter band was secured to the ocular tube by a rivet or screw operating in openings formed in the flange of the diopter band. The openings for the screw or rivet were not made until after the diopter band was adjusted relative to the instrument and as a consequence, the openings for the screw or rivet varied in different instruments and required individual selection. The assembly was completed by skilled workers and the cost of the assembly in consequence constituted a considerable part of the cost of manufacture of the instrument.

Figure 2:
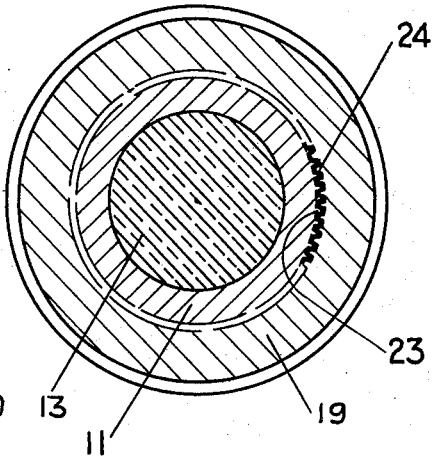
Fig. 2 is a section taken along line 2—2 of Fig. 1.
Figure 3:
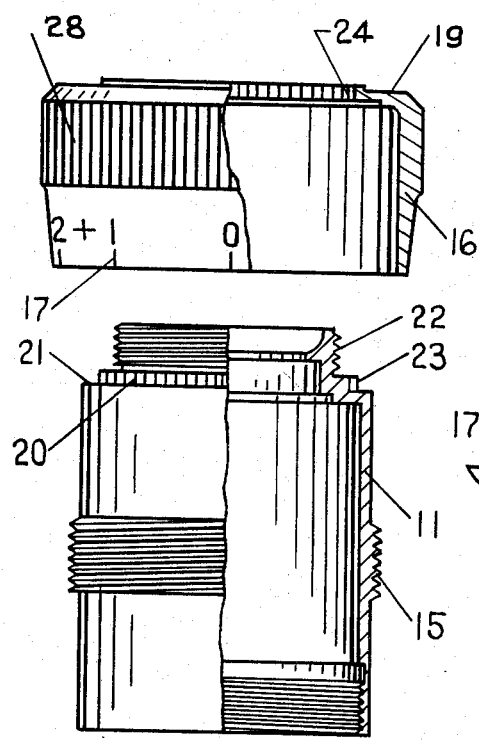
Fig. 3 is an exploded view of the diopter band and the ocular tube with portions of each broken away to show the holding surfaces.

According to this invention, this individual selection of the openings for the screw or rivet for the diopter band of each optical instrument is eliminated. In the now preferred embodiment of the device of the present invention the band 16 is formed with a surface provided with a plurality of means for interlockingly engaging with correlated means on a surface of the tube 11. Although the surfaces may be any contacting surfaces desired, it is now preferred to form the interlocking means on the peripheral surface of the reduced portion 20 of the ocular tube 11 and the defining wall of the opening in the flange 19 of the band 16. The interlocking means of the tube and band may comprise, as best shown in Figs. 2 and 3, an annular series of engaged teeth or serrations 23 and 24, respectively.

From the foregoing, it will be seen that when the diopter band 16 is assembled with the ocular tube 11 and the flange 19 of the diopter band is brought into facewise engagement with the shoulder 21 of the ocular tube 11, the teeth 24 engage and mesh with the teeth 23, and thus the band 16 is connected to the ocular tube 11 for movement therewith.

After the index 18 has been formed on the stationary mounting tube 12 and the ocular tube 11 has been adjusted to its infinity point, the diopter band 16 may be turned or adjusted with reference to the mounting tube 12 until the zero mark of the scale 17 on the diopter band 16 is caused to register with the index mark 18 on the mounting tube 12. When this has been done, the band is moved until the teeth are caused to engage. The engagement locks the diopter band to the ocular tube which can be driven or moved by manipulation of the diopter band.

Any suitable means may be employed for holding the serrated surfaces in engagement, but in the form of the invention now preferred, a locking ring 25 is turned onto the threaded end 22 of the ocular tube 11 and clamped against the outer face of the flange 19 of the diopter band 16. The locking ring 25 is held in position by means of a set screw 26, threaded through an opening formed in the locking ring 25, and into engagement with the flange 19 of the band 16.

The locking ring 25 is housed within an eye cap 27 which is affixed to the instrument by threading the same onto the locking ring 25.

As the teeth 23 and 24 are made quite small, they can be engaged after the scale of the diopter band has been caused to register with the index of the mounting tube by merely turning the diopter band relative to the ocular tube.

In a heretofore proposed device in which the diopter band was affixed to the ocular tube through a pin carried by one of the members and adapted to be received in one of a series of notches or recesses formed in the other, the diopter band generally had to be moved from its adjusted position to cause the pin to enter the notch which was nearest to the pin. As it was necessary for structural reasons to form the pin of a considerable size, it was often necessary to move the diopter band as much as one-quarter diopter to bring the pin into a position in which it could be received by one of the notches. This is not so in the present invention, for actually the teeth are spaced apart in the embodiment now preferred a distance equal to a small fractional part of a diopter on the scale of the band. Thus the maximum distance which the diopter band need be moved after it has been adjusted relative to the ocular tube to bring the teeth into engagement is one-half the distance between two adjacent teeth. Therefore, the band can be mounted to the tube with a high degree of accuracy and the teeth can be so spaced that accuracy to within a minute fractional part of a diopter on the scale of the band can be reached.

As the coupling between the tube and band is made by the annular series of meshing teeth, strain is reduced to a minimum and there is little, if any, danger of the coupling failing in use as often happened in the pin-and-notch coupling of prior instruments.

Figure 4:
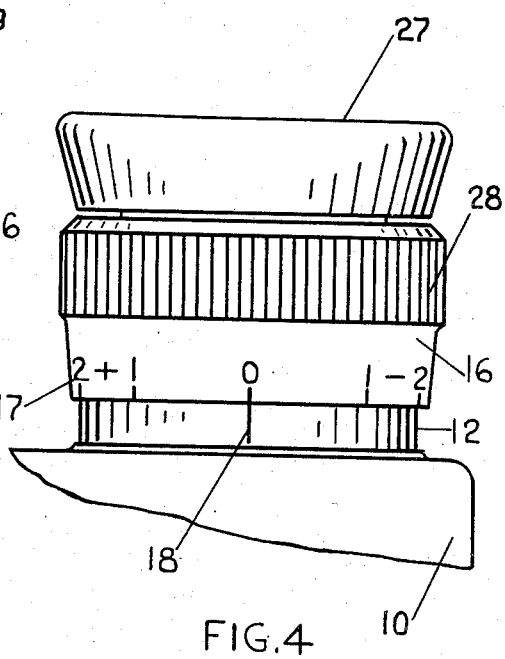
Fig. 4 is an elevational view showing the relation of the diopter ring to the index on the ocular tube.

To facilitate adjustment of the ocular tube through manipulation of the diopter band, the exterior surface of the latter, usually gripped by a user in the adjusting operation, is knurled as shown at 28 in Figs. 3 and 4.

As the interlocking parts are identical in all instruments, the parts may be formed by any approved production method in a quantity thereby reducing the cost of the same and as they can be assembled without the necessity of employment of skilled labor, the assembly of this part of the instrument is reduced. The reduction in the cost of the parts as well as the reduction in the cost of assembly of the same, brings about a considerable reduction in the cost of the finished instrument.

While one embodiment of the invention has been disclosed, it is to be understood that the invention need not be limited to the device as described, but is susceptible of modification falling within the spirit of the invention and the scope of the appended claims.

I claim:

1. In an instrument of the type described, an ocular tube; means for adjustably mounting said tube to the body of said instrument; a scale-carrying band circumscribing said tube; an annular series of projecting means carried by said tube; and an annular series of projecting means carried by said band and adapted to engage and interlock with the projecting means carried by said tube for holding the tube and band against relative rotation.

2. In an instrument of the type described an ocular tube; means for adjustably mounting said tube to the body of said instrument; a scale-carrying band telescoping said ocular tube; and means for holding said ocular tube and band against relative rotation, said means comprising a pair of contacting serrated surfaces, one of said surfaces being formed on said band, the other of said surfaces being formed on said ocular tube.

3. In an instrument of the type described a tube fitted to the body of said instrument; an ocular tube adjustable axially of said tube; a scale-carrying band telescoping said ocular tube; and interlocking means for connecting said band to said ocular tube for movement therewith, said means comprising an annular toothed surface on said band and an annular toothed surface on said tube engaged by said first-name toothed surface.

4. In an instrument of the type described an ocular tube; means for adjustably mounting said tube to the body of said instrument; a scale-carrying band telescoping said ocular tube; means for holding said ocular tube and band against relative rotation, said means comprising a pair of contacting serrated surfaces, one of said surfaces being formed on said band, the other of said surfaces being formed on said ocular tube; and means for holding said serrated surfaces in contact and against separation.

5. In an instrument of the type described a stationary mounting tube carrying an index; an ocular tube adjustable axially of said mounting tube; a band carrying scale indicia for cooperation with the index of said mounting tube and circumscribing the same; an annular series of teeth formed on the exterior surface of said ocular tube; and an annular series of teeth formed on an interior portion of said band and engaging the teeth of said ocular tube whereby said ocular tube is locked to the band for rotational movement therewith; and means for holding said band against movement axially of said ocular tube.

6. In an instrument of the type described an ocular tube; means for mounting said ocular tube to the body of said instrument for reciprocal movement along the optical axis thereof; an index carried by said body; a scale-carrying band circumscribing said tube, the scale of said band cooperating with said index to indicate the position of said tube; an annular series of teeth formed on the exterior surface of said tube; and an annular series of teeth formed on the interior surface of said band and engaged by the teeth of said tube to hold the tube and band against relative rotation, the teeth being spaced apart a distance substantially less than the graduations of said scale.

7. In an instrument of the type described, a mounting tube fixed to the body of said instrument; an index on said tube; a shouldered ocular tube adjustable axially of said mounting tube; a band telescoping an end of said ocular tube, said band having a scale marked on the peripheral surface at one end thereof and an internal annular flange at the opposite end thereof, said flange engaging the shoulder of said ocular tube; a plurality of teeth formed on the end face of said flange; and a plurality of teeth formed on the peripheral surface of said ocular tube adjacent said shoulder and engaged by the teeth of said band.

8. In an instrument of the type described, an ocular tube; means for adjustably mounting said tube to the body of said instrument for movement axially thereof upon rotation of said tube; a scale-carrying band circumscribing said tube; and means for coupling said ocular tube to said band for rotation therewith, said means comprising a plurality of cooperative meshing elements formed on the internal circumference of said band and the outer circumference of said tube whereby said ocular tube will be rotated upon rotation of said band, rotation of said tube moving said tube axially of said instrument body.

CLARENCE J. ECKERT.